US005103486A

United States Patent [19]

Grippi

[11] Patent Number: 5,103,486

[45] Date of Patent: Apr. 7, 1992

[54] FINGERPRINT/SIGNATURE SYNTHESIS

[76] Inventor: Victor J. Grippi, 2648 W. Ball Rd. #151, Anaheim, Calif. 92804

[21] Appl. No.: 513,095

[22] Filed: Apr. 19, 1990

[51] Int. Cl.[5] ..... G06K 9/00

[52] U.S. Cl. ..... 382/4; 382/3; 382/59

[58] Field of Search ..... 382/3, 4, 5, 59; 356/71

[56] References Cited

U.S. PATENT DOCUMENTS

| | | | |
|---|---|---|---|
| 3,806,704 | 4/1974 | Shinal | 382/3 |
| 3,955,178 | 5/1976 | Warfel | 382/3 |
| 4,048,618 | 9/1977 | Hendry | 382/4 |
| 4,078,226 | 3/1978 | Eer Nisse et al. | 340/146.3 |
| 4,202,626 | 5/1980 | Mayer, Jr. et al. | 355/52 |
| 4,385,285 | 5/1983 | Horst et al. | 382/3 |
| 4,513,437 | 4/1985 | Chainer et al. | 382/3 |
| 4,821,118 | 4/1989 | Lafreniere | 382/4 |
| 4,856,077 | 8/1989 | Rothfjell | 382/3 |
| 4,905,293 | 2/1990 | Asai et al. | 382/4 |

*Primary Examiner*—Leo H. Boudreau

[57] ABSTRACT

Signature verification systems are disclosed utilizing a hand held writing implement (10) used to combine a user's fingerprint pattern and their hand written signature. A prism detector (14) is scanned by a laser diode (16) and the resultant image is optically transmitted onto either a writing surface specifically designed to receive this image or directly intergrated with use of an optical ballpoint (110) into the applied ink simultaneous to inscription on the writing surface. Detection array (72) converts this optical image into signals appropriate for data interface and processing for use in on line verification systems which can be used at point of signature locations where a user may seek positive identification.

5 Claims, 6 Drawing Sheets 28
12
10
48

36
14
58
64
30
32

28
42
12
40
46
10
44
48
50
24
52
26
36
18
3
16
54
56
34
30
3

FINGERPRINT/SIGNATURE SYNTHESIS

BACKGROUND-FIELD OF INVENTION

This invention relates to the verification of handwritten personal signatures, specifically to a new method which will positively collate a signature with its author.

BACKGROUND-DESCRIPTION OF PRIOR ART

There exists in todays society an ever increasing need for identification of individuals beyond the primitive act of self identity given by their written sign. Even the duties of trained notary publics can be compromised with the use of fraudulent identification. A requirement for a device that can identify, for example, the user of a credit card, the user of a bank check, signed contracts and agreements or any related document of a proprietary nature and provide a permanent record is greatly needed. A method is needed that permits persons gaining access to security areas, at base or remote field site locations, to be identified through their individual identification feature. Comparison of physical symbols of ones signature has proven unreliable and at best guess work, the combining of an individuals most unique identifying feature is needed.

Heretofore, signature verification methods have dealt primarily with dynamic or cryptographic analysis of an individuals signature. Some, involve assigning cryptographic keys or symbols that will encode a signature. Some, include methods of measuring pressures and accelerations developed on a writing device or platen during the act of making a signature. Examples of this latter type of verification can be found in U.S. Pat. Nos. 4,078,226, 4,513,437, 4,128,829. In all of the above stated references a problem exists in the percentage of correlated signatures. Rarely does an individual excercise and duplicate the movements involved in writing a signature. Fatigue, stress, writing position, and rushing can alter the dynamics of a signature. Even over time an individual signature will slowly change giving rise to further miscorrelations.

Another method involves assigning cryptographic symbols or keys that encode a signature. U.S. Pat. Nos. 4,202,626 and 4,856,077 are representive of this type of method. In U.S. Pat. No. 4,202,626 there is shown a device that allows for overlaying of an identification number with the in question signature. It then acts only as a model to be compared by either of two methods. First, by human eye through the use of a viewer, and second by machine means which then relies upon signature dynamics as the only means of verification. A further disadvantage is that any cryptographic key is susceptible to compromise by persons gaining access to such information. The identifying feature is an arbitrary symbol, and no means exist to check the actual signature.

A well trained fraud could easily duplicate, with enough accuracy, a signature which would be accepted as valid by these systems. Additionally these systems use elaborate and expensive equipment which are generally not portable. In the case of U.S. Pat. No. 4,856,077 a signature is encoded using a bar code type background. This background is sensed with a fiber optic pen tip used for data input into a computer. However in order to acheive this correlation, a person must execute his signature exactly to duplicate the previously stored data.

While allowing some degree of security, no prior art system has been developed that can accurately discriminate a high percentage of signatures without undue rejections. A method is needed whereby positive identification can be obtained reliably with first time acceptance and be able to provide a hard copy record for future interrogation.

OBJECTS AND ADVANTAGES

Accordingly, several objects and advantages of my invention are to provide a positive means of signature verification utilizing a new method and apparatus unknown in the prior art.

A further object of the present invention is to provide signature verification whereby the unique characteristics of an individuals fingerprint is combined with the individuals handwritten signature.

Yet another object of the present invention is to provide a device capable of fingerprint/signature synthesis, which can embody stand alone or networked on-line versions.

Still another object of the present invention is to provide a means for detection of live skin tissue used in the Fingerprint/Signature Synthesis process, thereby preventing fraudulent similation of a humans finger ridge pattern.

Yet further object of my present invention is to provide financial documents, sales transaction documents, legal documents, and the like with designated areas where the Fingerprint/Signature Synthesis can be duly recorded, stored and made available for later authenication purposes.

In accordance with the present invention, a hand held self contained apparatus is proposed whereby a user can identify himself with no special effort or excersion as would normally be made by writing with the common pencil or ink pen.

An additional object is to provide a device capable of direct integration of the fingerprint pattern into the ink or writing substance during the actual handwritten signing process.

The primary advantage of the present invention over the prior art, involves verification of ones signature by combining their personal fingerprint pattern with their personal written signature. Authenticity is assured by enabling the device only upon detection of live skin tissue just prior to fingerprint detection. At this time, the detected finger ridge pattern is then projected by laser means onto a document or the like for a permanent record, immediately before and simultaneous to inscription of the users signature onto the aforementioned document. This superimposing combination provides a level of security previously unobtainable with dynamic or cryptographic type verification systems.

In the case of the latter system, U.S. Pat. No. 4,202,626 to Mayer, uses an optical lens to encode an account number along with the users signature. In a similar manner the cryptograph combines this account number superimposed with the signature for the purpose of checking authenticity. This is then to be used as an example on a preprinted document only. There exists no means for verification of the subject signature itself, while the account number can be easily decoded once the crypto method is compromised. This system contains many mechanical parts which will require routine maintenance and adjustment.

In the case of dynamic signature verification reference is made to any in this class, which are distinguishable by using pressures, accelerations, velocities, derived from the users hand motion. These inherently variable parameters do not exhibit a high degree of accurancy, even under ideal conditions duplication can not be achieved. When these parameters are lowered one finds many erroneously validated signatures along with it. It is a principle advantage of this present invention to use one of man's most proven identification features, the fingerprint, along with his seal of approval, the signature.

Further objects and advantages of my invention will become apparent to those skilled in the art from consideration of the following description with reference given to the appended drawings.

DRAWING FIGURES

In the drawings, FIGS. 1–6 illustrate the principle embodiment of the present invention, while FIGS. 7 and 9 deal with a modified version of the present invention.

FIG. 1 is a perspective view of the hand held writing device used to perform Fingerprint-Signature Synthesis.

FIG. 2 is a side view revealing the internal structure of the hand held writing device.

FIG. 3 is a view in detail of the portion indicated by the section lines 3—3 of FIG. 2, and is shown in a typical writing position.

FIG. 4 is a functional block diagram of the hand held writing device.

FIG. 5 is a perspective view of an on-line verification system that can be used with the hand held writing device.

FIG. 6 is a functional block diagram of the on-line verification system.

FIG. 7 shows a second embodiment used for direct ink imaging in a modified hand held writing device.

FIG. 8 shows an example of Fingerprint-Signature Synthesis as it would be recorded on a typical document.

FIG. 9 shows an example of Fingerprint-Signature Synthesis as it would be recorded directly into the applied ink simultaneous to inscription of a signature.

DESCRIPTION OF DRAWINGS

Reference is now directed to FIG. 1, where there is shown a hand held writing device 10, which can be used as a stand alone device or as an on-line device, both of which embody the teachings of the present invention.

View/Off/Sign switch 36 also occupies a cutout in outer shell 12 and is secured by molded retaining clips made therein. Electrical conductors are attached to View/Off/Sign switch 36 by standard fabrication practices.

Figure 2:
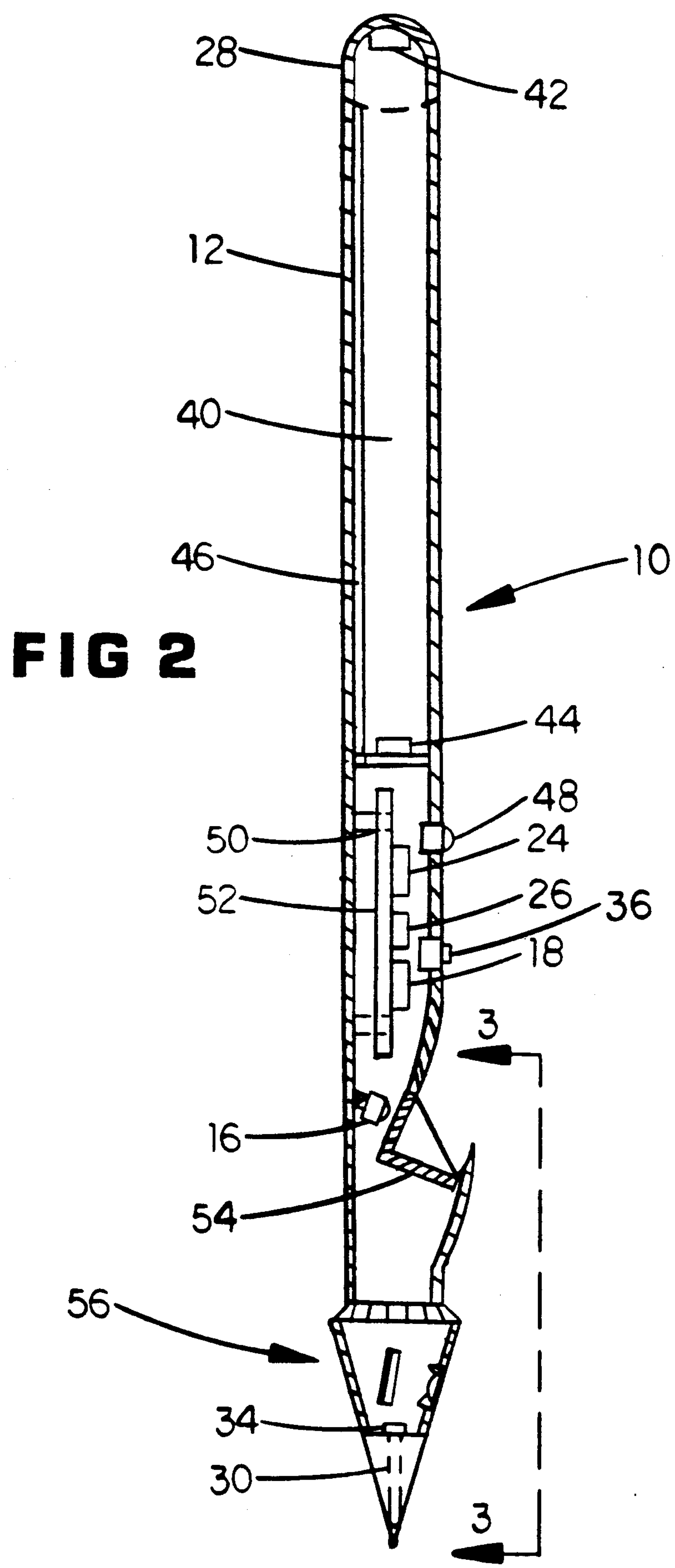

As seen in FIG. 2, the area located between the battery storage compartment horizontal partition and the prism detector 14 houses the electronic control circuitry. Wherein pulse detection circuit 24, laser drive circuit 18, and switching circuitry 26 are located in separate integrated packages mounted with mounting hardware 50 to a common printed circuit board 52. These afforementioned circuits are all known and proven to those skilled in the art and may incorporate several variations. Their functions and context in this present invention will be discussed with detail hereinbelow in this specification.

Figure 3:
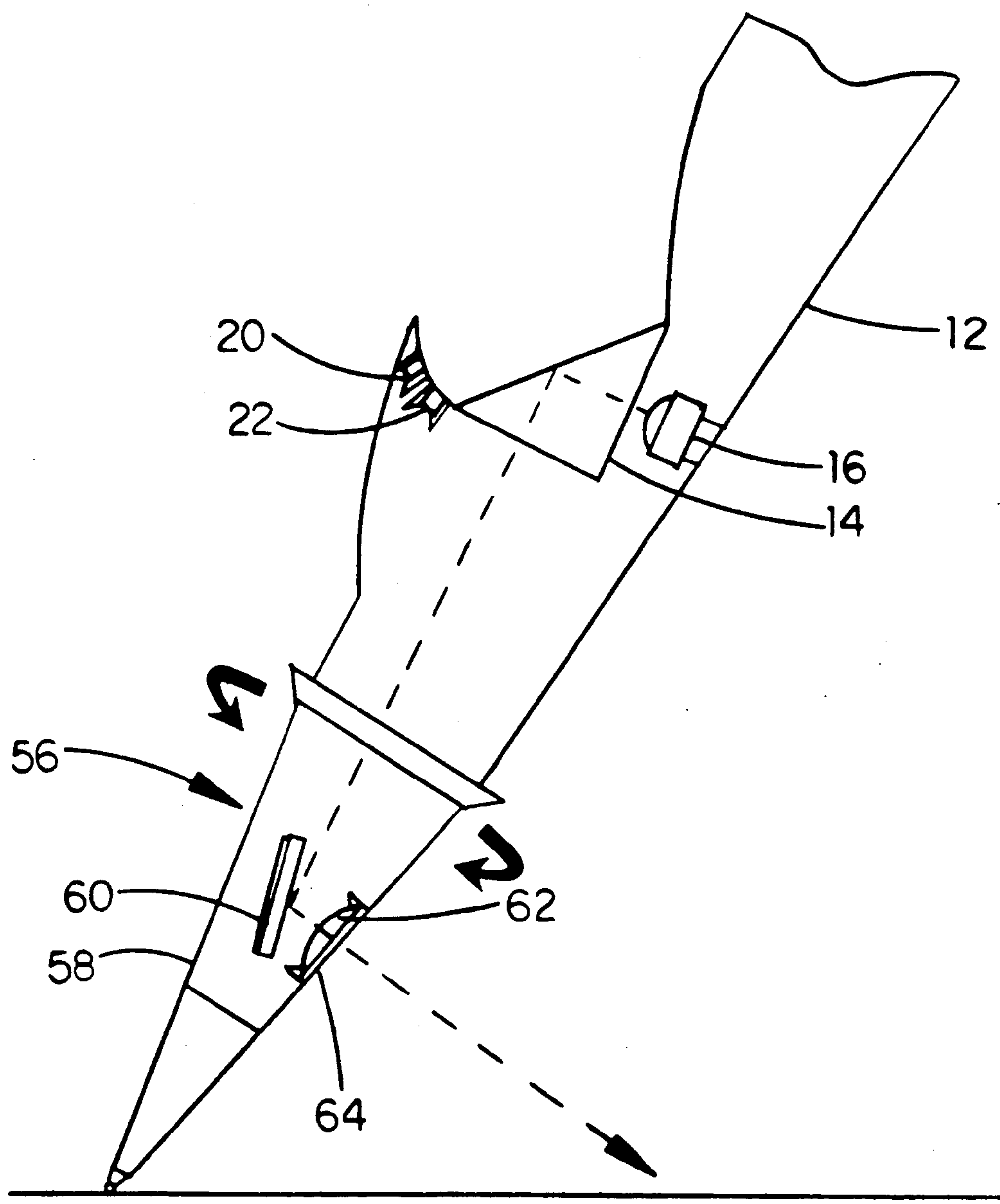

As seen in FIGS. 2 and 3 an optical detection and image projection means is provided in keeping with a preferred embodiment of this invention. As best seen in FIG. 2, optical detection is performed by prism detector 14, however it is to be understood that other means for fingerprint detection could be used and would still fall within the scope of this invention. A slot cut around the perimeter of prism detector 14 would receive retaining frame 54 used for securing prism detector 14 to outer shell 12. Retaining frame 54 would then be attached to the interior of outer shell 12 by molded retaining clips unitary to outer shell 12. This arrangement would also provide a light tight seal preventing degradation caused by ambient light. Physically, prism detector 14 is to be of a size suffient to detect a large enough cross section of a human finger to allow projection of distinguishable patterns, but not necessarily the entire finger ridge pattern. An area of 2 cm by 2 cm will suffice.

As best seen in FIG. 3, a fingerhood is located adjacent to prism detector 14, and is formed into outer shell 12 during manufacture. This fingerhood allows positioning of a subject finger along an axis condusive to detection, and houses pulse detection l.e.d. 20, and pulse detection photodiode 22. These components being mounted in cutouts and secured by retaining clips formed into outer shell 12. Electrical connection is made with pulse detection l.e.d. 20, and pulse detection photodiode 22, through standard practice and conductors are ran via the interior of outer shell 12 to the pulse detection circuit 24.

A signing laser diode 16 is mounted on the interior of outer shell 12, as can be seen in FIG. 3. A perpendicular partition with an opening is used to secure signing laser diode 16 in place. Signing laser diode 16 is a commercially available semiconductor laser diode which is packaged in a cylindrical T.O. can style that includes an embedded dispersion lens. It emits coherent light in the infrared region at a wavelength of 10.6 um. It is used here to illuminate the finger ridge pattern through prism detector 14 causing internal reflection thereby deviating the finger ridge image from the outer prism surface to the adjacent surface located on the interior of hand held writing device 10. so that it is incident upon a directional mirror 60. This directional mirror 60 is part of the left/right selector system 56, consisting of parts 58, 60, 62, 64. Attached directly to and integrated into outer shell 12 is a rotatable outer shell 58, which is constructed with the same material and manner as outer shell 12. Rotatable outer shell 58 rotates 180 degrees between two indented points, made into outer shell 12, labeled left and right. Serrations formed into rotatable outer shell 58 serve to facilitate ease of operation. The left/right selector system 56 provides image direction of the finger ridge pattern optically as the requirement changes for those who write left handed or right handed.

The angle of reflection off of directional mirror 60 is equal to the incident angle of the received prism image. Rotating this assembly does not change the angle of incidence, only the direction of the projected beam. Therefore directional mirror 60 is secured to rotatable outer shell 58 by an internal slot made in rotatable outer shell 58 encircling the entire perimeter of directional mirror 60. Another element in the left/right selector system 56 is the image lens 62, which is secured into rotatable outer shell 58 by upper and lower clips made therein. Image lens 62 is a double convex projection type lens made out of commercially available optical material. Positioned directly in front of image lens 62 in line with its optical plane is optical window 64. Wherein optical window 64 is neutral in its optical characteristics, it serves to protect image lens 62 from the outside environment.

In FIG. 2, located below left/right selector system 56 and continuing in a line parallel to the center axis of hand held writing device 10, is located ink cartridge momentary switch 34. It is mounted to a horizontal partition which extrudes from the vertical inside walls of the lower end of the threaded portion of rotatable outer shell 58. Ink cartridge momentary switch 34 is adjusted to make contact with the top surface of ink cartridge 30 when it is at its end of travel position. As the ink cartridge tip contacts the writing surface the force developed pushes this assembly upward causing an integral tab to close ink cartridge momentary switch, removing the tip will cause the force to be removed by spring action to its resting position. Ink cartridge 30 and ink cartridge shroud 32 are of a type and style commonly used in replacable ink pens.

Figure 4:
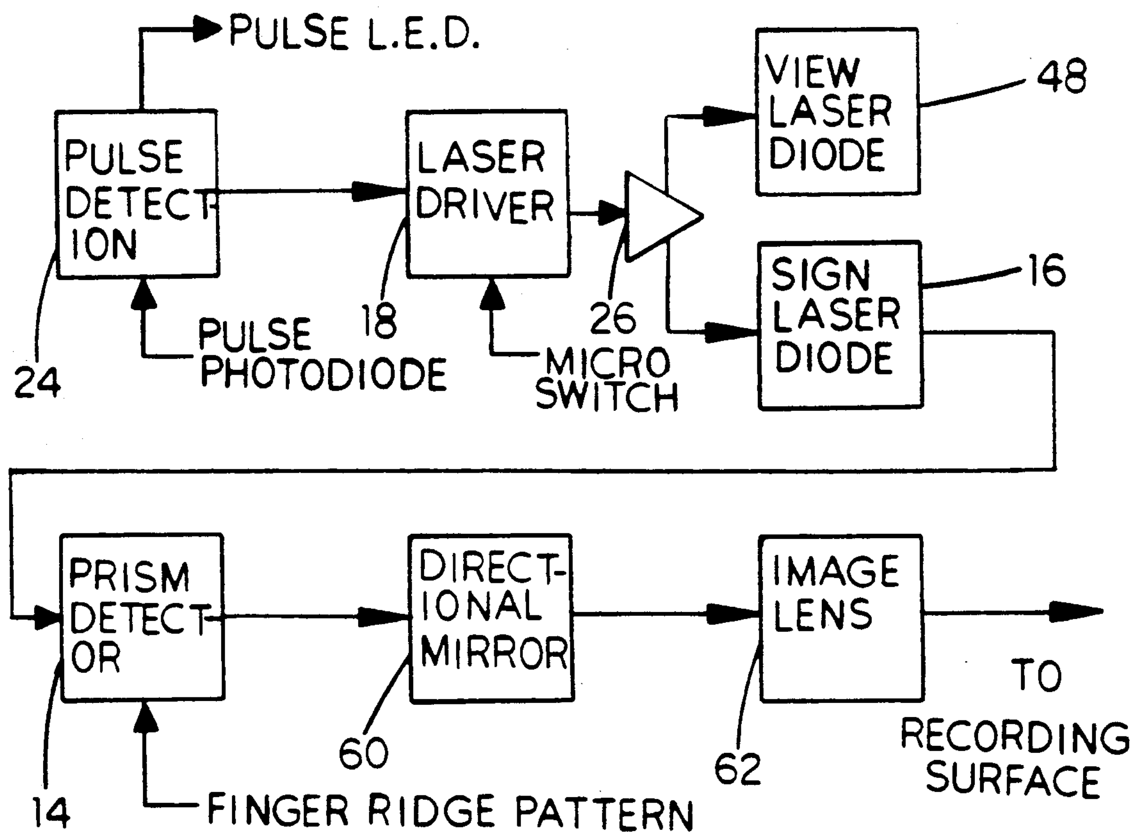

Reference is now made to FIG. 4, where there is shown a functional block diagram of hand held writing devive 10. Pulse detection circuit 24 uses an l.e.d. to emit light and a photodiode to receive this light reflected from the human skin of a subject finger. This received signal is compared to the output signal being sent to the l.e.d. Any variation in signal current is them detected as a pulse. This in turn enables an output from pulse detection circuit 24 and is sent to laser drive circuit 18, and is one of two required signals needed to turn on signing laser diode 16. The second signal needed is derieved from the closure of ink cartridge momentary switch 34. Without both of these signals image projection is denied. Supply current sufficient to drive signing laser diode 16 is obtained from an integrated dc—dc converter, which comprises a major portion of laser drive circuit 18.

Laser diode selection is dependent upon the position of view/off/sign switch 36, located on the outer surface of outer shell 12. At this point functions become optical, with the coherent beam being emitted by signing or viewing laser diode 16 or 48. Signing laser diode 16 emits into prism detector 14 and the finger ridge pattern then becomes incident upon directional mirror 60. Reflection off this concave surface then enters image lens 62 where the image is then projected through optical window 64 and onto the targeted area.

Figure 5:
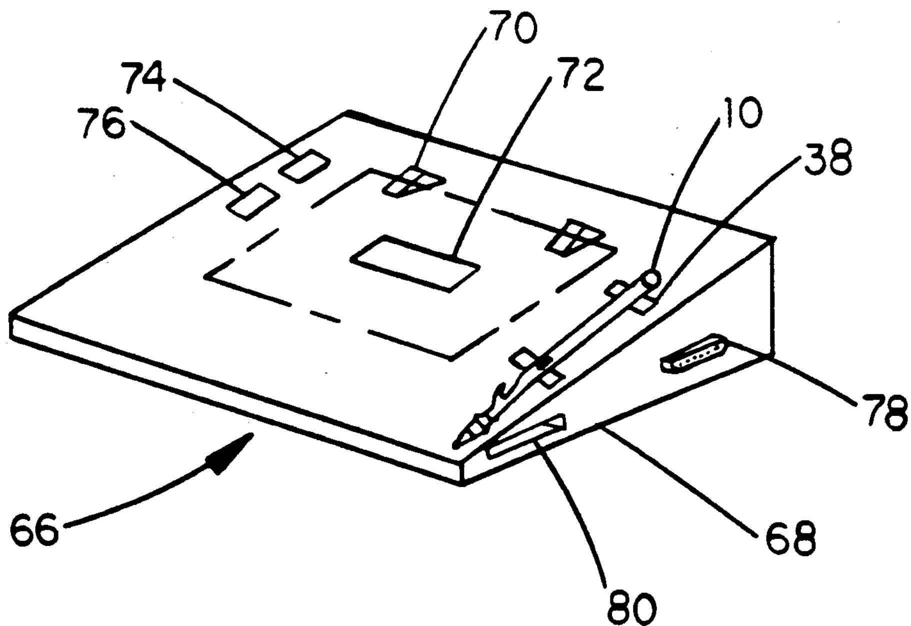

As seen in FIG. 5, a preferred embodiment of an on-line verification system is shown which provides signature verification at the point of signature. This verification system 66 converts the projected image from the hand held writing device 10 of FIG. 1, into a plurality of electrical signals capable of data input into computer protocols appropriate for data transmission. A second function is to provide signature verification through comparison of data stored on an insertable credit card style storage medium, which would be carried by the person seeking identification. Verification system 66 comprises an enclosure 68 made of a rigid material used to house and protect the components built therein. Writing device holder 38 is used to hold and secure the hand held writing device 10 of FIG. 1. A detection array 72 is located in a cutout of enclosure 68, and is mounted there using standard nut and bolt hardware. Detection array 72 is a commercially available pin diode array which is sensitive to infrared light to include the 10.6 um wavelength projected by the hand held writing device 10. Valid 74 and invalid 76 indicators are mounted in enclosure 68 to provide a pass/fail indication during use.

Data I/O port 78 is mounted in enclosure 68 to allow interface into on-line network systems. As described above in the second function of the verification system, a card slot is provided to accept an identification or credit card for data retrieval. A preferred method for data retrieval includes using an optical storage medium such as, a polymer or polycarbonate material made into a thin substrate which would contain the finger ridge pattern of the holder of the card. A verification laser diode 92 would interrogate this image on the substrate and with the use of a laser detection array 98 convert the image into a plurality of electrical signals. These signals would then be compared internally using a microprocessor to the received detected pattern derived from the signer at the point of signature. The above text describes the stand alone features of the verification system 66. Using this method elliminates data interface into a computer network and will create a lightweight mobile hand held verification system.

Figure 6:
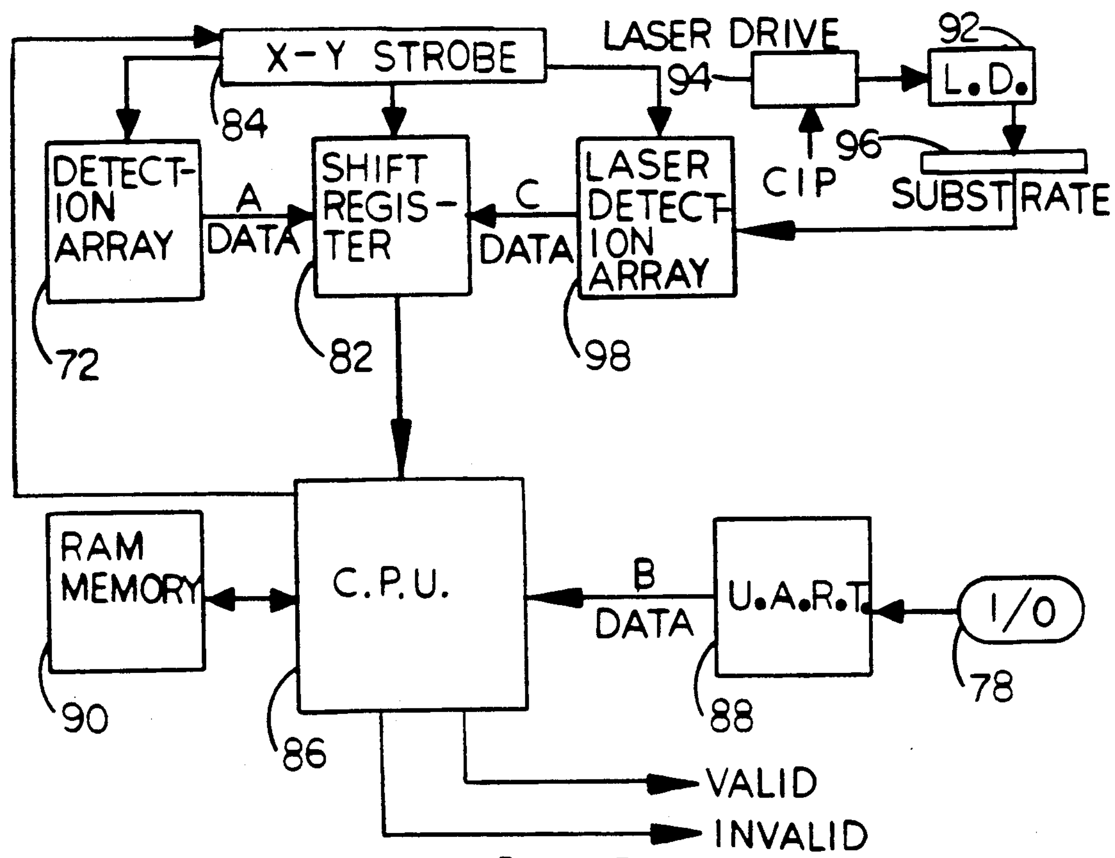

In FIG. 6 there is shown the functional block diagram of the verification system(both versions combined). Inputs are received from three sources which we will label A data, B data, and C data. 'A' data is taken from the detection array 72 of FIG. 5 where a plurality of electrical signals is the result of quantum conversion. The optical signal made incident on detection array 72 originates from the output of hand held writing device 10, and contains the finger ridge pattern. Detector shift register 82 receives the plurality of signals from detection array 72, these are sent synchronously from a common x-y strobe 84. This allows x-y data from the detection array to be sent synchronously into the central processing unit, C.P.U. 86. Here real time data comparison can take place using firmware algorithms commonly known in the present art. Which perform decoding and correlation of bit patterns.

The second 'B' data signals are received from data I/O port 78. This data may embody many protocols and formats all of which are within the teachings of this invention. Universal asynchronous receiver transmitter 88 is used as an interface for the on-line networked version of verification system 66. 'B' data is then inputed into C.P.U. 86 where it can be stored in ram memory 90 for comparison with 'A' data. Again firmware algorithms are used for decoding and correlating bit patterns.

The third 'C' data is indicate of the stand alone version and may be included within the same enclosure as the on-line version. These signals originate with the insertion of a credit card type medium that contains a substrate embedded in a square area and is optically transmittive to allow interrogation by a laser beam. Similar to the laser scanning of a compact disc used to store music data, however here we will encode finger ridge pattern data. Verification laser diode 92 is driven from verification laser drive circuit 94 to produce a coherent light source. This light source illuminates the substrate 96 containing the recorded finger ridge pattern of the person seeking identificaton. An incident image is then converted by laser detection array 98 into a plurality of electrical signals which are then strobed into shift register 82 by x-y strobe 84. This allows 'C' data to be inputed into C.P.U. 86 for storage into ram memory 90, and subsequent comparison with 'A' data for the purpose of verification. As a note to the above process; verification laser drive circuit 94 needs to receive the card in place signal, C.I.P., that is sent by the closure of a microswitch when a card is inserted. Proper outputs are provided upon verification or rejection of the compared results in the form of valid or invalid signals sent from C.P.U. 86.

Figure 1:
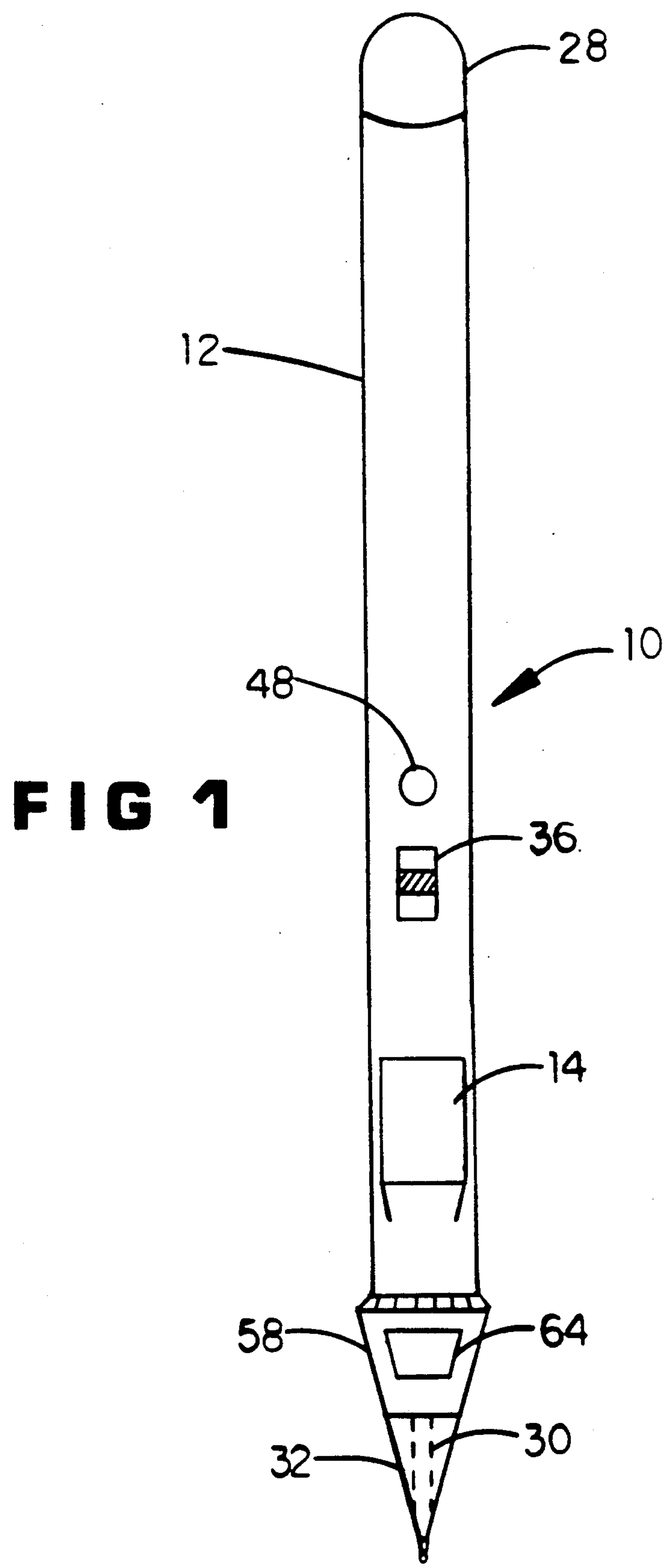
As illustrated in FIG. 1, hand held writing device 10 comprises outer shell 12 which encases and protects the components contained therein. Outer shell 12 is an elongated synthetic plastic or composite material which is threaded on its upper and lower ends. The upper end accepts removable cap 28, while the lower end accepts ink cartridge shroud 32. Therebetween a battery storage compartment 40 is provided and contains terminals 42 and 44 these are positive and negative terminals respectfully. They are electrically connected to suitable conductors that are placed inside inner channel 46 which lies between outer shell 12 and battery storage compartment 40. Viewing laser 48 is located in the mid-section of outer shell 12 where a break line is located to detach the upper and lower halves of outer shell 12. This allows access to the inner areas of hand held writing device 10. Viewing laser 48 occupies a cutout in outer shell 12 and is secured by retaining clips. Viewing laser 48 is a commercially available diode laser packaged in a cylindrical T.O. can style, with leads that are suitable for electrical soldering.
Figure 7:
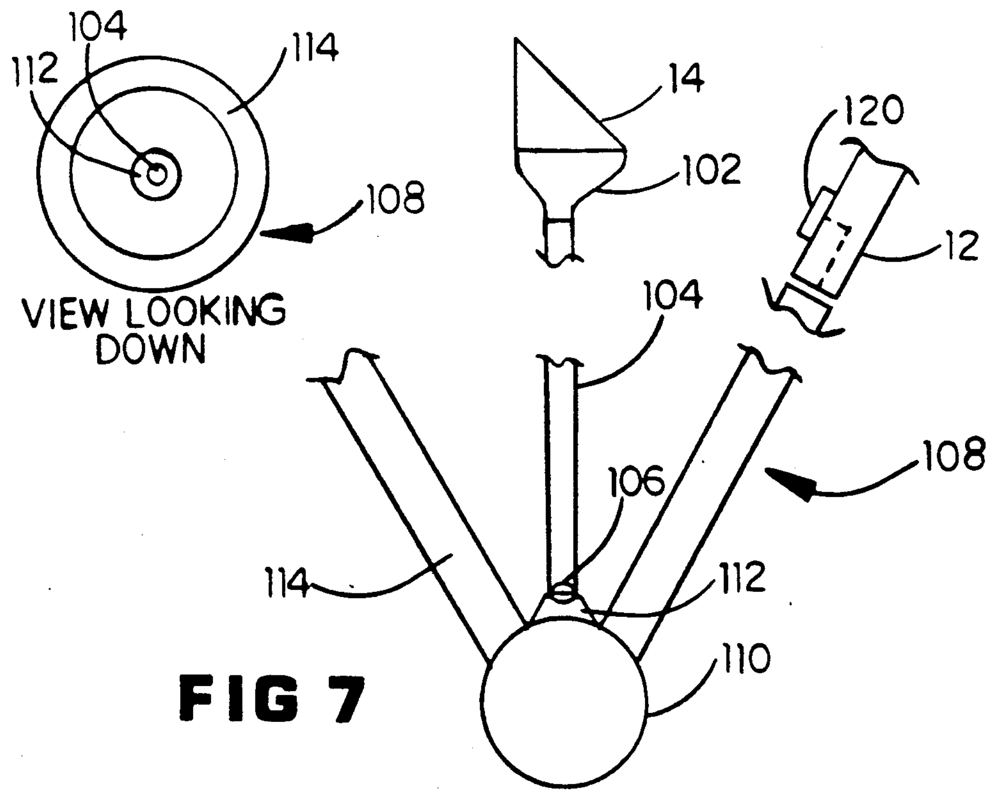

As seen in FIG. 7, a second embodiment of the hand held writing device 10 of FIG. 1 is shown. The principle modification being in the method of image projection made onto the writing surface. In contrast to Fingerprint-Signature Synthesis performed by optical projection through an optical window onto the writing surface, a direct projecton method is herein described. In FIG. 7 a portion of the hand held writing device is shown which is identical to hand held writing device 10 of FIG. 1 in parts and material with the exception of a modified image transmission system beginning at the output of prism detector 14.

Fiber optic taper 102 attached directly to prism detector 14 during manufacture, collimates the optical finger ridge pattern into fiber optic cable 104. Fiber optic cable 104 is made of a bundle of commercially available glass single mode fibers. These fibers are precision cut and ground to facilitate mating against fiber optic taper 102 thereby reducing any optical losses. Fiber optic cable 104 is then routed within the interior of outer shell 12 along a path parallel with the vertical walls of outer shell 12. Fiber optic cable 104 terminates with the mating of its end surface against fiber optic lens 106, which is now located in the center of concentric ink cartridge 108. Fiber optic lens 106 being a convex projection type lens is used to project the optical data contained within fiber optic cable 104. Concentric ink cartridge 108 attaches to outer shell 12 by tapped threads made into its rigid material and accepted by mating threads made into the lower end of outer shell 12. This allows for replacement of concentric ink cartridge 108 when necessary.

An integral optical ballpoint 110 is press fitted into the lower end of concentric ink cartridge 108, and is capable of free rotation therein. Optical ballpoint 110 is made out of an optically transmittive material such as a polymer or a polycarbonate material, and is shaped into a round ball similar to those used in conventional ballpoint ink pens. Concentric ink cartridge 108 contains ink channel 114 located around the perimeter of the vertical elongation of the cartridge. Optical ballpoint 110 is fitted so that it contacts ink within ink channel 114. However, due to the ink resisting polymer material of optical ballpoint 110 and the pressence of ink buffer 112, no ink is present on the surface of optical ballpoint 110 at the point of contact with ink buffer 112. This ink buffer is located directly in front of fiber optic lens 106 in a path that receives the optical image from fiber optic lens 106. Ink buffer 112 is used to separate the ink within ink channel 114 and the remaining components within concentric ink cartridge 108. Ink buffer 112 is a commercially available optical window made out of glass or any optically neutral material, and fits into a cutout of concentric ink cartridge 108 when this member is screwed on.

Figure 8:
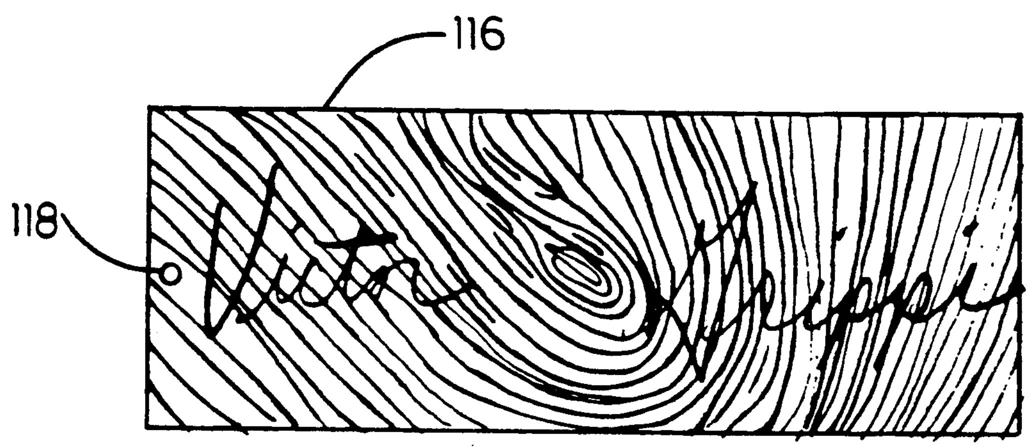

FIG. 8 shows an example of fingerprint-signature synthesis as recorded in a designated signing box on a typical document. Signing box 116 is a chemically treated area which is contigent upon and integrated into the surrounding document be it a sales transaction slip, contract, saving bond, or the like. One such chemical additive to the document composistion can be a pigment commercially marketed as Afflair by EM Industries of Hawthrone, N.Y. This lamellar pigment has been demonstrated to show permanent color change when exposed to laser light. It can also be made into a printing ink used within this invention. Using the proper combination of paper and pigment additive the optically transmitted finger ridge pattern will exhibit a permanent recording on the paper surface along with a transmission through the paper surface. This latter quality enables the use of stand alone or networked on-line verification systems previously shown. An aligment dot 118 may be used to direct the tip of hand held writing device 10 of FIG. 1 prior to projection and inscription to allow for pattern alignment within signing box 116.

Figure 9:
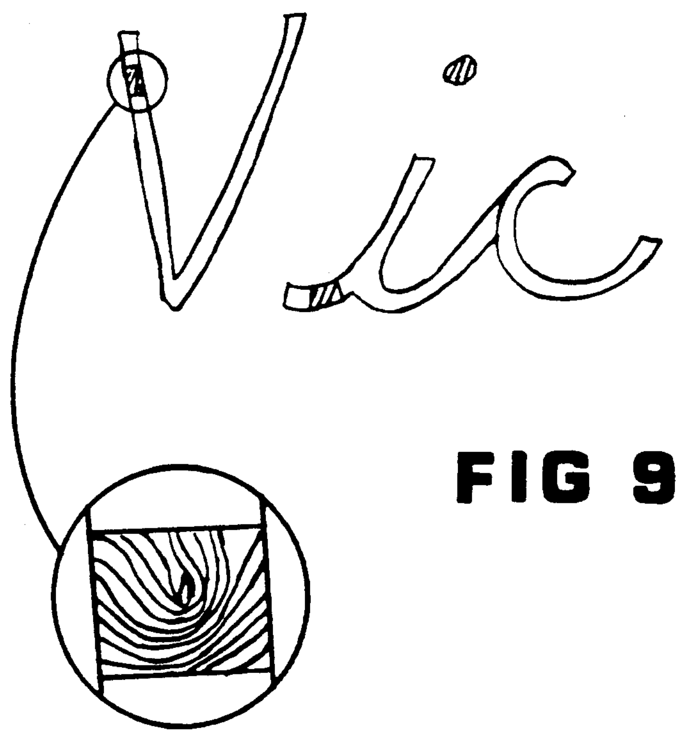

FIG. 9 shows an example of fingerprint-signature synthesis as recorded within the inscribed ink made incident upon a writing surface. This is the resultant image created by the direct projection method using the embodiment of FIG. 7. Here the finger ridge pattern is directly integrated into the applied ink simultaneous to incription on the writing surface. Upon magnification by visible or machine means, this image may be interrogated for verification of a persons signature. A pressure contact switch 120 may be used to sense each time the writing tip of hand held writing device 10 is raised and lowered. As shown in FIG. 7, pressure contact switch 120 is mounted to the inside vertical wall of outer shell 12, near the threaded junction of concentric ink cartridge 108. Its sensing tip is embedded into outer shell 12 so that it will sense the applied force when the writing device tip contacts the writing surface. Its signal is then sent to laser drive circuit 18 in this embodiment. This way a finger ridge pattern will be printed into the applied ink throughout a signature preventing fraudulent alterations.

OPERATION OF INVENTION

The following description will include an operational explanation of the details previously discussed in this present invention. In practice, a user seeking to identify himself by creating a personalized signature, needs to only grasp hand held writing device 10 in either his left or right hand; although it may be noted that any body member exhibiting identifing features may be used. Next the operator manually slides view/off/sign switch 36 to the sign position with any available finger, then lowers the ink cartridge tip to the writing surface. What occurs when the view/off/sign switch 36 is moved from the off position is as follows.

Continuity from the closure of contacts of view/off-/sign switch 36 cause electrical current to flow from batteries located within the battery storage compartment 40 to all components requiring an electrical potential to operate. Imediately upon power up, pulsation detection circuitry is activated and power is applied to pulse detection l.e.d. 20 located in the fingerhood area of outer shell 12. If pulsation is detected by pulse detection photodiode 22, then live skin tissue in contact with prism detector 14 has been verified. Pulse detection circuitry 24 monitors the photodiode output as feedback from the reflected signal originally sent to the l.e.d. Upon acceptance of a pulse the pulsation detection circuit 24 outputs an enable signal that is sent to laser drive circuit 18. This signal is one of two required enable signals needed to activate this drive circuit. The second signal originates from the activation of ink cartridge micro switch 34 or pressure contact switch 120, depending on which embodiment is used. In this way, only a real finger will be detected at the instant the writing tip is coincident upon the writing surface.

Prism detector 14 is illuminated by the coherent light emitted from signing laser diode 16. Being a right angle prism, prism detector 14 internally reflects the coherent image formed by a finger ridge pattern pressed onto its surface. Signing laser diode 16 has been found to operate at a wavelength of 10.6 microns, and operates under a dissipated surface power of 10-2 j*cm2. This operation is within the maximum permissible exposure limits as set forth in the ANSI national standard Z136.1-1986 for skin exposure to laser light.

At this point the optical image obtained from contact with prism detector 14 will be processed in two ways depending on which embodiment is used. First, the projection before signing method will be discussed, as shown in FIGS. 2,3,4,8. The optical finger ridge pattern is optically aligned along an axis to be incident upon directional mirror 60, which is part of left/right selector system 56 used to provide proper image direction for left handed or right handed users. The concave construction of directional mirror 60 causes collimation of the optical image into a more compact field for projection purposes. Image lens 62 then receives this image and projects it through optical window 64. The focal length is dependant on the physical distance between the image lens 62 and the targeted writing surface.

The second method of fingerprint-signature synthesis is the projection during signing method as shown in FIGS. 7 and 9. It is to be understood that this method could also be used with a verification system such as the one shown in FIG. 5, or may be used as a stand alone device without any specially prepared surface to write on. User operation is similar to the first method described above, however, no alignment within a signing box is required. The user simply grasps the hand held device in the hand he chooses to sign with, locates his finger on prism detector 14, and manually slides view-/off/sign switch to the sign position. Moving this switch to the view position will cause switching circuit 26 to activate the viewing laser diode 48, located on the body of outer shell 12, to turn on for the purpose of viewing a recorded synthesis pattern. What occurs next is the internal operation of the device.

Upon contact with the writing surface, pressure contact switch 120 is activated and an electrical enable signal is sent to laser drive circuit 18, satisfing the second signal requirement needed before turning on signing laser diode 16.

The first signal being sent by pulse detection circuitry 24 as previously described. Operation is identical as in the first embodiment up to this point. After the detected image is internally reflected in prism detector 14 the resultant image is collimated by fiber optic taper 102 to allow transmission within fiber optic cable 104. Fiber optic cable 104 is a bundle of a plurality of single mode fibers that together form an imaging array capable of resolution necessary for image verification. Typical bundle diameters range in size from 0.032" to 0.250" with individual fibers being 10 microns or less in diameter. Fiber optic lens 106 is used to collimate and project the individual optical images carried within each fiber into an integrated optical image. This lens projects into and through optical ballpoint 110. With the use of ink buffer 112 no interference is created between ink located on the upper point of the optical ballpoint 110, at the point directly in line with the incident transmitted path. In this way only ink located along the lower hemisphere of optical ballpoint 110, and ink that is simultaneously being applied to the writing surface is exposed to laser radiation. Since the image is only pulsed momentarily a single image pattern is left in the ink at a point located shortly after tip contact is made with the writing surface. Until the tip is raised and lowered again, normal ink transfer is made. (Refer to FIG. 9)

To accomplish the above stated image transfer process recent developments in pigment technologies will be utilized. Namely non contact laser marking technology which enables permanent high resolution printing onto surfaces containing lamellar pigments. The coherent light from the laser causes a photochemical reaction in these lamellar pigments which are generally mica particles coated with titanium dioxide or ferric oxide, and are also known as pearlescent pigments. They are commercially available and marketed under the brand name Afflair, registered trademark of EM Industries, Inc., Hawthorne, N.Y. Afflair is sensitive to a laser wavelength of 10.6 microns which is the operating wavelength of signing laser diode 16.

With the pigment suspended into the ink contained within concentric ink cartridge 108, during manufacture, a medium for image transfer is obtained. Only those pigmented particles exposed to the laser, during the signature writing process, and applied onto the writing surface will be affected and create a permanent image. These pigment particles can also be integrated into paper compositions during manufacture allowing for recordation, as earlier discused, into the signing box 116 specifically designated as such on documents.

SUMMARY, SCOPE, RAMIFICATIONS

Thus the reader will see that Fingerprint/Signature Synthesis is a highly reliable method for signature verification both in real time on line systems, and in recorded signatures that provide positive evidence for later verification.

It permits the user seeking identification to practice no special effort or excersion as would normally be required during handwriting with a common pen or pencil.

It provides detection of live skin tissue thereby preventing fruadulent simulation of a user's fingeridge pattern.

It provides direct integration of a user's fingerprint into the applied ink for permanent recordation without the possibility of being unnoticably altered.

It allows for a portable, lightweight, and convienent device well suited for diverse commercial applications.

Although the description above contains many specificities, these should not be interpreted as limiting the scope of the invention, but as merely providing illustrations of the preferred embodiments of this invention.

For example—devices employing detection arrays can be made to accomodate many sizes of documents, credit cards, sales transaction slips, etc. The hand held writing device may embody various sizes and shapes using alternative fingerprint detection methods and optical transmission techniques could also vary. A version not described herein may entail direct interface with the hand held device to a computer through use of internal conversion of the fingerprint pattern and data 1/0 drivers for on line verification. Additionally, image transfer may involve a silver halide crystal method, similar to those used in photographic emulsion techniques. Other image transfer methods include, using an optical felt tip, similar to the common felt tip pen, which in theory operates like optical ballpoint (110) described herein.

Another variation may involve use of a second signing laser diode. The first being used to detect the users finger ridge pattern by scanning the prism detector, then through the use of an internal photodiode array, conversion to a plurality of electrical signals can be achieved. These signals can then drive a second laser diode which is used for projection purposes. This allows for a higher powered laser than that used for finger scanning. Thus the scope of this invention should be determined by the appended claims and their legal equivalents, rather than the examples given.

What is claimed is:

1. A method of verification comprising the steps of:

(a) inscribing a user's signature on a writing medium using a hand held device;

(b) projecting an image of the user's fingerprint onto the writing medium using the same hand held device;

(c) combining said fingerprint image with said signature to form a composite representation; and (d) detecting said composite representation to verify the user's identity.

2. The method of claim 1, wherein said projection of user's fingerprint includes projection of any biological feature of the user.

3. The method of claim 1, wherein said projection is optical.

4. The method of claim 1, wherein said projection is electrical.

5. The method of claim 1, wherein said projection is magnetic.

* * * * *